United States Patent Office 2,708,682
Patented May 17, 1955

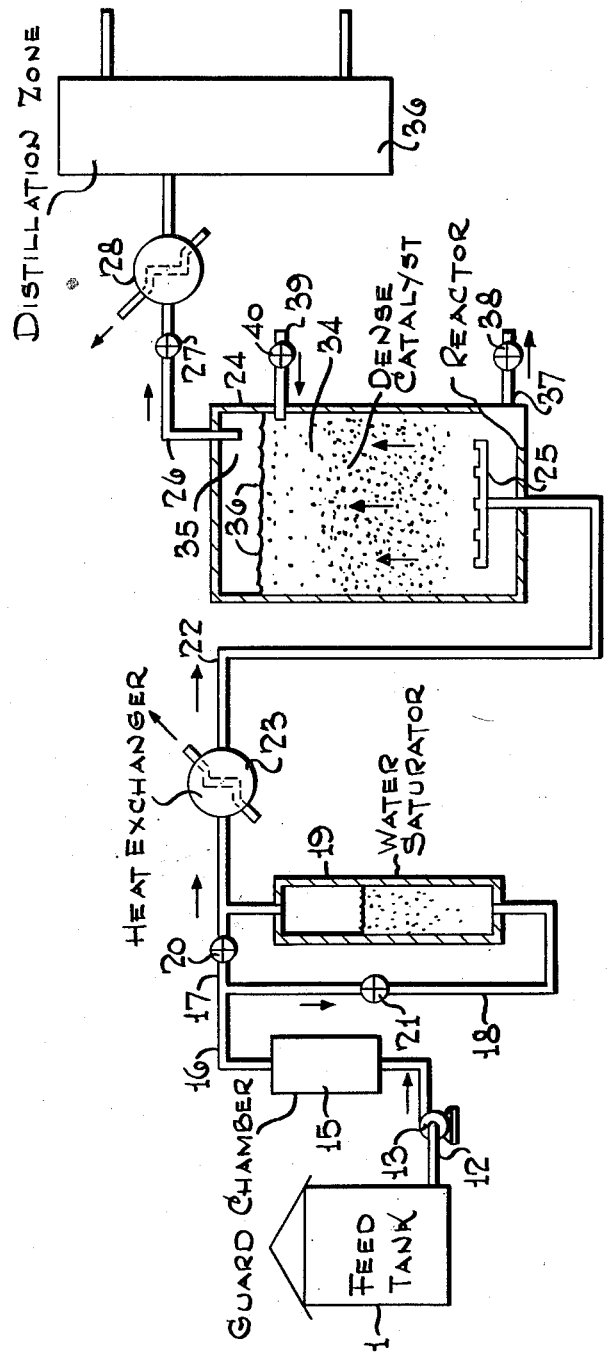

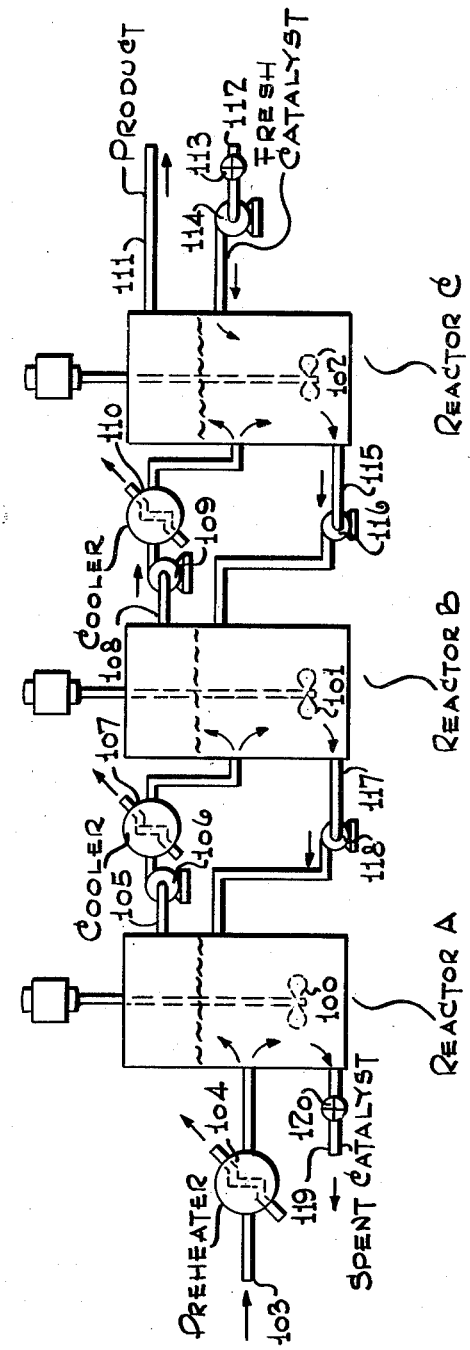

2,708,682

POLYMERIZATION OF OLEFINS WITH SLURRIED CATALYST

Louis Dauber, Elizabeth, Robert H. Mueller, North Plainfield, and William K. Fell, Scotch Plains, N. J., assignors to Esso Research and Engineering Company, a corporation of Delaware Application June 19, 1951, Serial No. 232,322

6 Claims. (Cl. 260—683.15)

This invention relates to a method for polymerizing olefins employing a slurried polymerization catalyst. More particularly it relates to a polymerization process in which normally gaseous olefins are polymerized to normally liquid polymers employing a solid, finely divided phosphoric acid catalyst maintained as an agitated slurry in the olefinic hydrocarbons at relatively high pressure conditions.

In the past olefins usually have been polymerized to low molecular weight polymers suitable for inclusion in motor gasolines and for other uses by passing them through a fixed bed of solid, granular catalyst, such as solid phosphoric acid. The polymerization reaction is highly exothermic, and difficulty has been experienced in controlling reaction zone temperatures. Reaction zones of the tubular type, steam jacketed reactors or banks of heat exchangers with catalyst inside the tubes are generally employed. Frequently, hot spot conditions occur in the catalyst bed and adversely affect catalyst activity and life. This difficulty is particularly noticeable when the reaction is carried out at high pressures. Under such conditions high reaction rates and poor transverse heat transfer caused by poor mixing of the olefin charge stock make temperature control difficult. In addition feeds containing relatively high concentrations of olefins lead to high local heat release in the reaction zone which makes heat control even more difficult. Tubes containing stationary granular catalyst are difficult to clean and charge with fresh catalyst. Heat balance in the reaction zone is generally maintained by external cooling and the feed stock is usually heated to reaction temperature before charging, to avoid localized cooling effects.

Fluidized powdered polymerization catalysts have been used to polymerize olefins at relatively low pressures, such as below 300 to 400 p. s. i. g., in the gaseous phase. Since low pressures are used, the capacity of equipment of a given size is relatively small. Furthermore, solid phosphoric acid catalysts have been found to have relatively short life in fluid bed operations of this type due to excessive carbonization and due to adsorption of deactivating, high molecular weight hydrocarbons on the catalyst.

It has been found that these limitations on prior processes may be overcome or minimized by conducting polymerization of low molecular weight olefins in the presence of a finely divided, solid phosphoric acid catalyst that is maintained as a dense slurry or suspension in a dense hydrocarbon phase comprising the olefins. The reaction is carried out at sufficiently high pressures to maintain dense hydrocarbon phase conditions. Therefore, the catalyst particles are continuously subjected to a washing action by the hydrocarbons which minimizes catalyst contamination and prolongs the life of the catalyst.

It has also been found that the reactants and catalyst must be subjected to intense and severe agitation that is preferably mechanically induced in order to obtain the efficient washing action heretofore mentioned, to obtain commercially feasible olefin conversions, to obtain uniform distribution and suspension of the catalyst, and to achieve heat balance within the reaction zone. Heat control offers little difficulty even with feeds containing relatively high olefin concentrations.

Certain nitrogen compounds contained in normally gaseous olefins deactivate phosphoric acid catalyst rapidly. This is particularly true of olefins produced in catalytic cracking operations and is an extremely serious objection in well-mixed slurry operations, since the entire catalyst mass is subjected to the deactivating influence and catalyst life is short. It is an object of this invention to provide means for overcoming this difficulty.

It is also an object of this invention to disclose means for improving catalyst activity and life by controlling the rate of water injection into the reaction zone and by employing a smaller amount of water in the initial phases of the reaction than is employed in subsequent phases.

In addition, this invention comprises multistage operations and means for maintaining heat balance within the reaction zones by employing relatively cold fresh feed and interstage cooling of effluents. These permit the charge to the reactor to take up exothermic heat of reaction. This in turn reduces the amount of external heat exchange equipment and internal cooling equipment required.

The invention will be better understood by reference to the accompanying drawings in which Figure 1, partly in vertical section, represents a means for carrying out a single stage polymerization of olefins using slurried catalyst; and Figure 2 shows a means of carrying out a multistage polymerization operation with countercurrent flow of feed and catalyst.

In Figure 1, the numeral 11 designates a feed tank containing normally gaseous olefins such as those having from 2 to 5 carbon atoms. Preferably the feed contains from about 30 to 90% olefins, such as $C_3$ and $C_4$ or mixed $C_3$ and $C_4$ olefins. A feed stream is passed from tank 11 through line 12 containing pump 13 upwardly through guard chamber 15. The feed is preferably pressurized to the pressure to be employed in the reaction zone in pump 13.

The guard chamber may contain silica gel or caustic supported on asbestos, and may comprise two or more contacting devices in series containing these materials. Concentrated aqueous caustic may be used as a washing medium if desired. The purpose of the guard chamber is to remove nitrogen compounds from the olefin feed in order to prevent subsequent deactivation of the phosphoric acid catalyst. If ammonia is formed in the scrubbing operation, it may be removed by an after wash with dilute sulfuric or phosphoric acids. Since most olefin-containing feed stocks, particularly those produced in various catalytic cracking operations, contain nitrogen compounds equivalent to as high as 8 or more parts per million of fixed nitrogen, it will be necessary to reduce the fixed nitrogen content to below about 1 p. p. m. in order to carry out the slurry polymerization step and obtain satisfactory catalyst life.

The olefin feed is then passed through line 16 containing branch lines 17 and 18. At least a portion of the olefin feed will be passed through line 18 upwardly through contacting zone 19 containing water in order to saturate the feed with sufficient water to maintain the desired catalyst activity during he polymerization step. In the range of about 0.1 to 0.6 gallon $H_2O$ per 1000 gallons feed should be introduced into the reaction zone during the reaction. It is preferred that the olefin feed to the reaction zone contain in the range of about 0.1 to 0.4 gallon of water per thousand gallons of feed during the initial portion of the run, and for this purpose it will be usually desirable to maintain the water in saturator 19 at a temperature of about 50° to 110° F. (for a 70% $H_2O$ saturator efficiency). The water content should then be increased to from 0.45 to 0.6 gallon per 1000 gallons of feed by increasing the saturator temperature to as high as 150° F. or by proper adjustment of valves 20 and 21 which will give the desired ratio of feed passed through the water saturator to that passed directly to line 22 containing heat exchanger 23. In starting up the polymerization reaction, during the first few hours of operation, it is usually preferred to bypass water saturator 19 completely, and to charge a relatively dry feed to the polymerization zone.

The feed is heated in heat exchanger 23 up to a temperature below the temperature to be maintained in the reaction zone. It is preferred that the temperature of the feed entering the reaction zone be such that its sensible heat up to the reaction temperature will substantially balance the exothermic heat of reaction evolved during the polymerization of olefins. Thus, the exact temperature level of the feed stream will depend on the olefin content thereof, the extent to which the olefins are converted to polymer in the reaction zone and other factors. Reaction zone 24 of the hindered settler type includes an inlet such as a pipe spider 25 or other distributing means connecting to line 22 which injects the olefin feed near the bottom portion of the reactor and upwardly therethrough. Effluent is withdrawn from zone 24 through line 26 connected to the upper portion of the zone, line 26 including a valve 27, and heat exchanger 28.

Reaction zone 24 includes a finely divided, solid phosphoric acid catalyst such as one having the size in the range of 20 to 200 mesh. Olefin feed is continuously injected upwardly through the zone at a sufficiently high rate to keep the catalyst suspended in the hydrocarbon fluid. The superficial velocity of the hydrocarbon through the fluid phase is usually in the range of 1 to 5 feet per minute to maintain the catalyst in slurry form. The catalyst is maintained as a dense phase 34 in the lower portion of the zone separated from disperse phase 35 by interface 36. The fluid in phase 35 is substantially free from suspended catalyst, the catalyst settling back into the dense phase 34 by the action of gravity.

Substantially catalyst-free effluent withdrawn through line 26 is then passed to distillation means 36 wherein polymers boiling in the gasoline boiling range are separated from the unreacted, normally gaseous hydrocarbons.

If the reaction zone effluent contains appreciable amounts of suspended catalyst, the effluent may be passed through a filtering means, not shown, before distillation or may be subjected to a further settling in order to separate the catalyst before the effluent is sent to a recovery system. After extended operation periods, the catalyst will tend to become deactivated. It will, therefore, be desired to remove a portion of the dense-phase slurry of catalyst and hydrocarbons intermittently or continuously through line 37 containing valve 38 from the bottom portion of the reaction zone. In order to maintain a substantially constant catalyst activity and constant catalyst inventory in the catalyst zone, fresh catalyst may be charged to the upper portion of the dense phase through line 39 containing valve 40. Conveniently the fresh catalyst may be slurried in polymer previously produced in the polymerization zone, or in other liquid hydrocarbon before it is injected into the reaction zone.

It is preferred that the temperature maintained in zone 24 be in the range of 350 to 600° F. If desired, zone 24 may be insulated, heat balance within the zone being achieved by permitting the relatively cool fresh feed to absorb the exothermic heat. The pressure in zone 24 is preferably above about 450 p. s. i. g. and in the neighborhood of the critical pressure for the hydrocarbon contents of the zone. Pressure should be such that the reactants are maintained in a single phase. Such pressures are usually in the order of 900 p. s. i. g., and higher, and are preferred because the fluid is in the highly dense condition which permits the catalyst to be suspended more easily and permits continuous washing of the catalyst to prevent its deactivation.

The maintenance of a well agitated suspension of the catalyst is an extremely important aspect of the present invention. It is necessary that the contents of the reaction zone be thoroughly mixed and kept mixed in order to keep the catalyst in suspension, to obtain good mixing of the olefins within the reaction zone, to permit heat balance to be achieved rapidly, and to improve catalyst washing. Preferably, stirring devices such as propellers and the like are employed in the reaction zone.

In Figure 2, three reaction zones, A, B, and C, of the same size are connected in series. Each zone includes a stirring means such as propellers 100, 101 and 102, each rotated by prime mover means exterior to the reaction zone. Each zone likewise includes a dense bed of finely divided, solid phosphoric acid catalyst maintained in suspension in fluid hydrocarbon by means of the stirrers.

A $C_3$ feed containing 50% propylene which has been treated to remove substantially all of the fixed nitrogen compounds is passed through line 103 including heat exchanger 104 into the dense catalyst bed of reactor A. The feed is heated up to a temperature of 270° F., in preheater 104 before charging into zone A.

Each reactor is maintained at a temperature of 450° F., and a pressure of 1000 p. s. i. g. The space velocity in the first reactor is 1.5 gallons of feed per hour per pound of catalyst (G./H./P.). Approximately 60% of the olefins are converted to polymers in reactor A. Effluent is withdrawn through outlet line 105 and is pumped by means of pump 106 to cooler 107 where its temperature is lowered to about 340° F. The effluent next is introduced into the catalyst phase of reactor B. In this zone the olefin conversion is increased to 84%.

Effluent is withdrawn from reactor B, through line 108, including pump 109, and is cooled to about 400° F., in cooler 110 before being passed to the dense catalyst phase in reactor C. The olefin conversion is increased to 94% in this zone, and effluent is continuously withdrawn from the zone through line 111 and sent to a recovery system, not shown.

The densities of the hydrocarbon fluids in zones A, B, and C, are respectively about 7.0; 8.3; and 9.5 pounds per cubic foot. The catalyst density in each reaction zone is maintained at about 30 pounds per cubic foot. By employing a 1.5 G./H./P. space velocity in the first zone, the overall space velocity is equivalent to 0.5 G./H./P.

Since it will be desired to maintain overall olefin conversions at above about 85%, it will be necessary to add fresh catalyst continuously, or intermittently. In order to attain the most effective utilization of the catalyst, it will be preferred to have the flow of catalyst countercurrent to that of fresh feed. This may be done by charging a slurry of fresh catalyst in polymer or other liquid hydrocarbon through line 112 containing valve 113 and pump 114 into the upper portion of the dense catalyst phase in reactor C. Suspended catalyst may be withdrawn from the bottom portion of reactor C through line 115, and pumped through pump 116 to the upper portion of the dense catalyst phase in reactor B. Likewise suspended catalyst may be withdrawn from reactor B through line 117 and pumped through pump 118 into the upper portion of the dense catalyst bed in reactor A. Spent catalyst is withdrawn from reactor A through line 119 containing valve 120. If desired, when the olefin conversion in zones A, B, and C reach about 40%, 68% and 86% respectively, countercurrent flow of the catalyst with the feed may be initiated, sufficient fresh catalyst being injected into reactor C to maintain the total conversion at a desired level.

Another convenient method of achieving countercurrent flow of catalyst and feed is that of employing three reaction zones in series, as shown in connection with Figure 2, until the overall conversion of olefins reaches about 85%. At this point the first reactor may be withdrawn from the system making reactor B the number one reaction zone. A reaction zone containing fresh catalyst is then connected to reactor C. The polymerization is continued until conversions again reach a low level. Again, the first reactor may be removed from the system and a reactor containing fresh catalyst added in the last position.

Although a multi-stage polymerization system has been shown employing three reactors, it will be obvious that 2, 3, 4 or even more reactors in series may be used effectively to obtain high olefin conversions and long catalyst life.

The catalyst used in the practice of the present invention is preferably one comprising phosphoric acid deposited on a siliceous support such as silica gel, kieselguhr, and the like. The catalyst should contain from about 50 to 90% phosphoric acid by weight and preferably from 75% to 85% by weight phosphoric acid in order to obtain effective olefin conversions. The fresh catalyst may have a size in the range of 20 to 200 mesh, preferably larger than 100 mesh; however, some attrition of catalyst will occur during the reaction and particles as fine as 300 mesh, or finer, will be formed. The term "finely divided, solid phosphoric acid catalyst" refers herein to catalysts of such sizes.

The olefin feed should preferably contain relatively small concentrations of ethylene because of the difficulty of polymerizing this olefin under the conditions employed in the slurry polymerization process. The term "normally gaseous olefins" refers to feed stocks including olefins having 2, 3, 4 and 5 carbon atoms.

The polymerization temperature will usually be in the range of 350° to 600° F.; however, temperatures of from 400 to 500° F. will be preferred in order to obtain high olefin conversions and to minimize the formation of carbonaceous material on the catalyst. Pressures in the range of about 450 to 1500 p. s. i. g. or higher should be used. Pressures are preferably maintained at above 900 p. s. i. g. for reasons previously explained. Under these conditions a single, highly dense hydrocarbon fluid phase exists which is conducive to high olefin conversions because of increased contact time, to ease of maintenance of catalyst in suspension, and to a continuous washing action on the catalyst which is beneficial in prolonging the active life of the catalyst.

It is generally desired that an olefin conversion of at least 75% be attained in the reaction zone, with preferable conversion levels of from 85 to 95%, particularly in multi-stage operations. It will usually be necessary, under the temperature and pressure conditions prevailing, to employ space velocities in the range of 0.1 to 2.5 G./H./P. Since propylene and ethylene are relatively difficult to polymerize, it will generally be necessary to use space velocities below about 1.5 G./H./P. in order to keep above 75% conversion with feeds including appreciable amounts of these olefins. On the other hand, with $C_4$ and mixed $C_3$–$C_4$ feeds, space velocities up to about 2.5 G./H./P. may be used. A preferred feed rate for the normally gaseous olefins is in the range of 0.25 to 0.75 G./H./P.

It will be necessary to maintain the fixed nitrogen content (probably as HCN, RCN, HSCN and the like) of the olefin feed below 1 p. p. m., in order to obtain commercially feasible operations. In multi-stage operation, however, it may be convenient to reduce the fixed nitrogen to a level of about 3 to 4 p. p. m. and to permit the relatively spent catalyst in the first reaction zone to reduce the nitrogen content to below 1 p. p. m. The effluent passing to subsequent zones is thus relatively free of harmful nitrogen compounds, and catalyst life is not impaired to any appreciable extent. Washing the feed with aqueous caustic (10% and higher concentration), hot aqueous caustic (up to 200° F. or higher) tripotassium phosphate solution and the like as well as contacting the feed with various adsorbent media, such as silica gel, may be used. After-washing with dilute acid may be used to remove any ammonia formed.

The following examples will illustrate the improvements to be obtained in the practice of the present invention.

*Example I*

Runs were carried out in which a $C_3$–$C_4$ feed containing about 19% propylene and 15% butene-2 was passed upwardly through finely divided, solid phosphoric acid-kieselguhr catalyst (75% $H_3PO_4$) at 1000 p. s. i. g. pressure in a hindered settler type reactor. The hydrocarbons and catalyst were not stirred mechanically. When using 60 to 80 mesh catalyst and a superficial fluid velocity through the reactor of about 4 feet/min., it was difficult to keep the catalyst suspended in the fluid. When using the 140–200 mesh catalyst at 425° F. reaction temperature, a fluid velocity of 1.6 feet/min., and a space velocity of 6.7 G./H./P., suspension of catalyst was improved. When using a $C_3$ feed containing about 27% propylene, good suspension of the catalyst was obtained particularly with relatively small particles.

When passing a $C_3$–$C_4$ olefin feed upwardly through a suspension of 78% $H_3PO_4$–20% $SiO_2$–2% $Ni_3(PO_4)_2$ catalyst (140–200 mesh) at 1000 p. s. i. g., 400°–450° F., and 0.62 G./H./P. at fluidizing velocities in the range of 1.5 to 5.5 feet per minute, olefin conversions of 82–84% were maintained for about 23 hours and excellent slurrying of the catalyst was obtained at all velocities.

When employing a mechanical stirrer operating at 200 R. P. M. a reaction pressure of 1000 p. s. i. g., temperatures of 350° to 385° F., and space velocities of 0.3–0.8 G./H./P. with either $C_3$ or mixed $C_3$–$C_4$ feeds, a 60–80 mesh phosphoric acid-kieselguhr catalyst was maintained in suspension. It was found that mechanically induced stirring made suspension of the catalyst independent of the type of olefin feed and fluid velocities, thus permitting lower space velocities to be used and higher olefin conversions to be obtained than in the upflow, unstirred reactor. For example, when operating in a stirred reactor containing 60–80 mesh phosphoric acid-kieselguhr catalyst at 370° F., 970 p. s. i. g., and 200 R. P. M. stirring speed with a feed containing about 11% propylene and 34% butylenes charged at a space velocity of 0.5 G./H./P., the catalyst was maintained in suspension. A polymer yield, based on the olefin, of 39 weight percent was obtained. The $C_5$ to 430° F., boiling range polymer produced had a CFRR clear octane number of 95.

*Example II*

A series of runs were carried out in which $C_4$ feeds containing 43 to 47% butylenes and various amounts of nitrogen compounds were charged to single stage stirred reactors containing finely divided phosphoric acid-kieselguhr catalyst. The reactor was maintained at a temperature of from 400°–450° F., 1000 p. s. i. g. pressure, and feed rates were in the range of 0.5–0.9 G./H./P. In some runs, the feed containing about 3 to 9 p. p. m. fixed nitrogen (as cyanides and other nitrogen compounds) was charged to the slurried catalyst. In other runs the feed was passed through beds of silica gel, silica gel and ascarite, or scrubbed with concentrated caustic followed by phosphoric or sulfuric acid washing to reduce the fixed nitrogen content to various levels. A run was also carried out in which the feed containing about 3 p. p. m. fixed nitrogen was charged to a reactor containing a fixed bed of granular phosphoric acid catalyst. Results of the runs are shown below.

| Type of Operation | Fixed Bed | Slurry | | | |
|---|---|---|---|---|---|
| Fixed Nitrogen in Feed, p. p. m. | 3 | 8 | 6 | 3 | <1 | <1 |
| Catalyst Age, Gallons of Polymer Produced/Lb. Catalyst: | Olefin Conversion, Percent | | | | | |
| 10 | 82 | 40 | 75 | 85 | 90 | 85 |
| 20 | 85 | *10 | 45 | 73 | 86 | 86 |
| 30 | 86 | | | 65 | 89 | 84 |
| 40 | 82 | | | 60 | 89 | 86 |
| 60 | 83 | | | 53 | | 81 |

*10% conversion at 14 gallons of polymer/lb. of catalyst.

In the fixed bed operation, the upper portion of the catalyst bed removed most of the nitrogen poisons permitting the remainder of the catalyst to maintain high activity for a long period of time. In well mixed slurry operations, however, the entire mass of catalyst was subjected to the deactivating effect of nitrogen compounds, and consequently catalyst life was relatively short with feeds containing above 1 p. p. m. High conversions were maintained for long operating periods by reducing fixed nitrogen to below 1 p. p. m. in the slurry operations.

*Example III*

A $C_4$ feed containing 43% olefins and below 1 p. p. m. of fixed nitrogen was passed into a reaction zone containing 40–60 mesh catalyst comprising 80% phosphoric acid on kieselguhr. The reaction zone was maintained at a temperature of 450° F. and the hydrocarbon and catalyst were vigorously agitated by a stirrer operating at 240 R. P. M. When operating at 1000 p. s. i. g. pressure and a feed rate of 0.5 G./H./P., an olefin conversion of 93% was obtained When operating at the same feed rate and a pressure of 500 p. s. i. g., the olefin conversion was 85%. When operating at a feed rate of 1.0 G./H./P. and 500 p. s. i. g., the olefin conversion dropped to 69%. In contrast, doubling the feed rate at 1000 p. s. i. g. will cause conversions to drop no more than about 5%, conversion being relatively insensitive to feed rate at high pressures when using $C_4$ feeds. The density of the hydrocarbon in the reactor at 500 p. s. i. g. is only about ⅓ the density at 1000 p. s. i. g. It is much more difficult to agitate a low density fluid than a high density fluid to keep the catalyst in suspension. Furthermore, residence time of feed in the reactor is proportionate to density; hence, a given reactor volume is more effectively used at high pressures. It is seen that pressures much below 450 to 500 p. s. i. g. are undesirable. Pressures in the neighborhood of the critical should be used for high conversions at high feed rates.

*Example IV*

A series of runs were carried out in reaction zones containing a mechanical stirrer operating at 300 R. P. M. A $C_3$ feed containing 55% propylene and less than 1 p. p. m. fixed nitrogen was passed through a water saturator at 110° F. before charging to the reactor. The catalyst includesd 80% of 40–60 mesh phosphoric acid-kieselguhr (80% $H_3PO_4$) and 20% of 20–50 mesh phosphoric acid-activated carbon (29% $H_3PO_4$). Pressures and temperatures were 1000 p. s. i. g., and 450° F., in all runs. A single stage operation and a three-stage series operation were carried out with fresh catalyst and identical operating conditions in all zones. In the multi-stage operation, catalyst-free effluent was charged from the first to the second of any two adjacent zones. The results of the runs follow:

| Type of Operation | Space Velocity, G./H./P. | Olefin Conversion Percent |
|---|---|---|
| Single Stage | 0.63 | 72 |
| Three Stages: | | |
| 1st Stage | 1.88 | 47 |
| 1st and 2d Stage | 0.94 | 71 |
| Overall | 0.63 | 85 |

These data show the surprising advantage to be gained for multi-stage operation in which the effluent from the first of two adjacent reactors is sent to the second adjacent reactor and there is no back mixing between stages. It is seen that at the same overall feed rate of 0.63 G./H./P., three-stage operation gave a 13% higher olefin conversion than did the single stage operation. Such conversions are quite good for propylene feeds, since this olefin is much more difficult to polymerize than are most butylenes.

*Example V*

A run was carried out with the same feed and operating conditions used in Example IV. The catalyst, however, comprised 20–100 mesh silica gel-base catalyst containing 78% $H_3PO_4$ and 2% nickel phosphate prepared by heat treating a mixture of silica hydrogel, $H_3PO_4$ and nickel salt. Three stirred reactors were operated in series, as in Example IV, with effluent from the first of two adjacent reactors being charged to the second adjacent reactor. However, countercurrent flow of catalyst and feed was obtained by removing the first reactor from service as soon as the overall olefin conversion dropped below 85% and adding a reactor containing fresh catalyst in the last position. This operation maintained a constant inventory of catalyst and enabled the product to contact fresh catalyst last which permitted obtaining good olefin cleanup. The run was carried out at an overall space velocity of 0.5 G./H./P. Three cycles were used; that is, after each cycle, the No. 1 reactor was removed, No. 2 reactor was made No. 1, No. 3 became No. 2 and a reactor with fresh catalyst became No. 3. The original No. 3 reactor was thus in the No. 2 and No. 1 positions during the run. The entire run lasted about 250 hours. Data from the runs are shown below:

| | Cycle 1 | Cycle 2 | Cycle 3 |
|---|---|---|---|
| Cycle Length, Hrs | 72 | 68 | 111 |
| 1st Stage, Initial Conversion, Percent | 61 | 42 | 47 |
| 1st Stage, Final Conversion, Percent | 41 | 34 | 43 |
| 2nd Stage, Initial Conversion, Percent | 89 | 69 | 79 |
| 2nd Stage, Final Conversion, Percent | 69 | 61 | 63 |
| Overall Conversion, Percent: | | | |
| Initial | 96 | 89 | 93 |
| Final | 86 | 83 | 84 |
| Gallons of Polymer Produced per Pound of Catalyst | 37.3 | 32.8 | 54 |

The life of the catalyst in the original No. 3 reactor is shown below:

| Cycle No. | Position of Original No. 3 Reactor | Catalyst Life, Gallons Polymer/Lb. Catalyst |
|---|---|---|
| 1 | 3 | 4.4 |
| 2 | 2 | 14.8 |
| 3 | 1 | 42.2 |

*Example VI*

A run was carried out using the same catalyst and reaction conditions as were used in Example V except that the water saturator for the feed was maintained at 120° F. (corresponding to 0.5 gallon $H_2O$ per 1000 gallons feed) instead of 110° F. (corresponding to 0.4 gallon H₂O per 1000 gallons feed). Olefin conversions fell off quite rapidly in comparison to the operation using feed saturated at 110° F., and the run was discontinued after only 48 hours.

A run was then conducted in the same manner as in Example V except that the water saturator was held at 110° F. during the first thirteen hours of the run, and the saturator temperature was then gradually increased to 120° F. during the next six hours and held at 120° F. for the remainder of the run. The run was continued for about 500 hours. The results of the run follow:

|  | Cycle 1 | Cycle 2 | Cycle 3 | Cycle 4 |
|---|---|---|---|---|
| Cycle Length, Hrs | 62 | 170 | 91 | 151 |
| Overall Conversion, Percent: |  |  |  |  |
| Initial | 93 | 93 | 94 | 92 |
| Final | 84 | 86 | 87 | 84 |
| Gallons of Polymer Produced per Pound of Catalyst | 31.4 | 87 | 45.2 | 78 |

It is seen that substantial improvements are obtained by initiating the polymerization with a relatively low water addition rate and then increasing the rate after the reaction has proceeded for a time period. Generally, the run should be initiated with from about 0.1 to 0.4 gallon H₂O per 1000 gallons feed during the first 10 to 50 hours of operation, preferably from 0.3 to 0.4 gallon H₂O per 1000 gallons feed during the first 15 to 25 hours. The water content is then increased by about 0.1 gallon or more to within the range of about 0.45 to 0.6 gallon H₂O per 1000 gallons feed during the remainder of the run.

Obviously, the water may be introduced into the reaction zone directly or may be introduced in other ways, the chief consideration being that an amount of water equivalent to that given in the above ranges be used during various portions of the run.

What is claimed is:

1. A continuous catalytic process for polymerizing olefins which comprises the steps of forming a plurality of reaction zones fluidly connected in series, each of which includes an agitated suspension of finely divided solid phosphoric acid catalyst in dense fluid hydrocarbon, and each of which is maintained at a polymerization temperature and a pressure above about 450 p. s. i. g., continuously introducing an olefin feed into the first of said plurality of zones, continuously withdrawing a substantially solid-free fluid effluent comprising unreacted olefin and polymer from the first of any two adjacent zones and introducing said effluent into said suspension in the second of said adjacent zones, and withdrawing substantially solid-free product effluent comprising polymer from the last of said plurality of zones, said olefin feed being charged to said first zone at a rate such that the over-all space velocity in said zones is in the range of 0.1 to 2.5 G./H./P., said process being further characterized by introduction into said first zone of about 0.1 to 0.4 gallon of water per thousand gallons of feed during the initial time period of the reaction after which the amount of water introduced to the said first zone is increased to about 0.45 to 0.6 gallon per thousand gallons of feed.

2. A process in accordance with claim 1 in which said initial time period is within the range of 10 to 50 hours.

3. A continuous catalytic process for polymerizing normally gaseous olefins to form polymers boiling in the gasoline boiling range which comprises the steps of forming in a reaction zone an agitated suspension of finely divided solid phosphoric acid catalyst in dense fluid hydrocarbon, continuously introducing feed containing normally gaseous olefins and containing less than one p. p. m. fixed nitrogen into said suspension at a space velocity in the range of 0.1 to 2.5 G./H./P., said reaction zone being maintained at a temperature in the range of 350° to 600° F. and a pressure above 450 p. s. i. g. whereby substantial olefin polymerization takes place, continuously withdrawing substantially solid-free fluid effluent including polymerized olefins from said zone while maintaining said catalyst in said suspension within said zone, and withdrawing a portion of the deactivated catalyst from said zone and replacing it with fresh catalyst as needed, said process being further characterized by introduction of about 0.1 to 0.4 gallon of water per thousand gallons of feed into the reaction zone during the initial portion of the reaction and introduction of about 0.45 to 0.6 gallon of water per thousand gallons of feed thereafter.

4. A process in accordance with claim 3 in which the said feed is at a temperature below the reaction temperature such that its sensible heat up to reaction temperature will substantially balance heat evolved in said polymerization.

5. A process in accordance with claim 3 in which said olefins and catalyst are agitated by passing said feed upwardly through said catalyst.

6. A process in accordance with claim 3 in which said olefins and catalyst are agitated mechanically.

References Cited in the file of this patent

UNITED STATES PATENTS

| | | |
|---|---|---|
| 2,291,216 | Gerhold | July 28, 1942 |
| 2,295,125 | Nelson | Sept. 8, 1942 |
| 2,318,719 | Schneider et al. | May 11, 1943 |
| 2,380,234 | Hall | July 10, 1945 |
| 2,446,619 | Stewart et al. | Aug. 10, 1948 |
| 2,470,904 | Shanley | May 24, 1949 |
| 2,559,576 | Johnstone | July 3, 1951 |
| 2,626,290 | Fell et al. | Jan. 20, 1953 |
| 2,626,291 | Betts | Jan. 20, 1953 |
| 2,626,293 | Sweetser | Jan. 20, 1953 |